Dec. 16, 1952             J. W. HULSE            2,621,427
AUTOMATIC LEVELING DEVICE FOR
WHEEL TYPE DITCHING MACHINES

Filed July 14, 1948            6 Sheets-Sheet 4

INVENTOR.
John Wesley Hulse
BY
ATTORNE

Dec. 16, 1952                J. W. HULSE                2,621,427
                    AUTOMATIC LEVELING DEVICE FOR
                     WHEEL TYPE DITCHING MACHINES
Filed July 14, 1948                              6 Sheets-Sheet 5

INVENTOR.
John Wesley Hulse
BY
Morris L. Bateman
ATTORNEYS.

Dec. 16, 1952

J. W. HULSE
AUTOMATIC LEVELING DEVICE FOR
WHEEL TYPE DITCHING MACHINES 2,621,427

Filed July 14, 1948

INVENTOR.
John Wesley Hulse
BY Morris & Bateman
ATTORNEYS

Patented Dec. 16, 1952

2,621,427

UNITED STATES PATENT OFFICE 2,621,427

AUTOMATIC LEVELING DEVICE FOR WHEEL TYPE DITCHING MACHINES

John Wesley Hulse, Northwich, England, assignor of one-half to W. L. Holland Limited, Preston, England Application July 14, 1948, Serial No. 38,577
In Great Britain July 24, 1947

3 Claims. (Cl. 37—97)

This invention relates to improvements in automatic leveling device for wheel type ditching machine.

The object of the invention is to provide a machine particularly adapted for agricultural ditching in which the ditch or trench may be formed with an even or level base irrespective of the contour of the surface of the ground and in which the excavator may operate in close proximity to a hedge or wall.

According to the invention a mobile ditching machine having a rotary excavator wheel is carried by a frame hydraulically mounted at one side of the machine on a wheeled chassis and at the other side on a skid, means being provided for supplying fluid under pressure to maintain the frame horizontal or at a predetermined inclination to the direction of travel irrespective of the contour of the ground.

The invention will be described with reference to the accompanying drawings.

Figure 1:
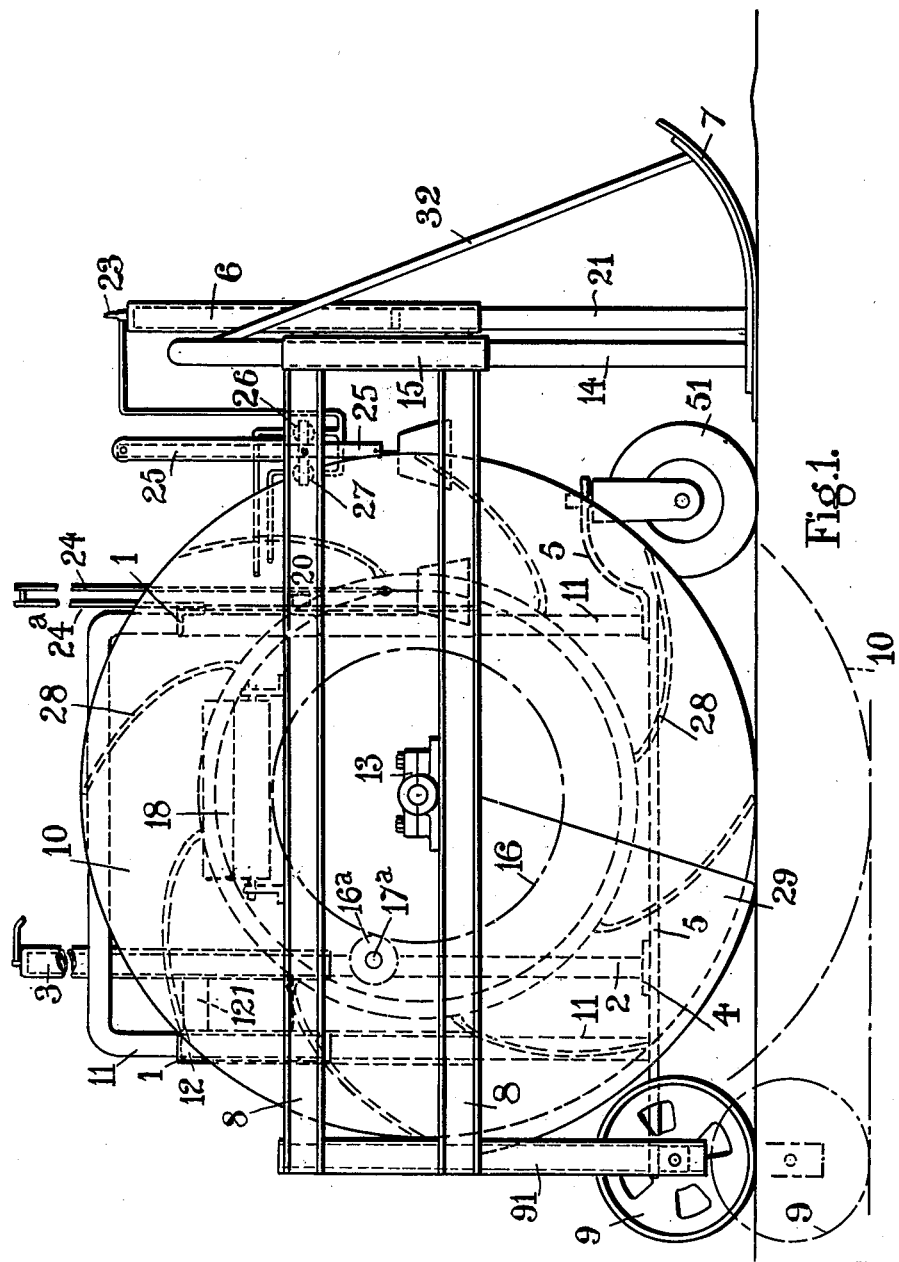
Fig. 1 is a side elevation of the machine, certain parts being removed for clearness.
Figure 2:
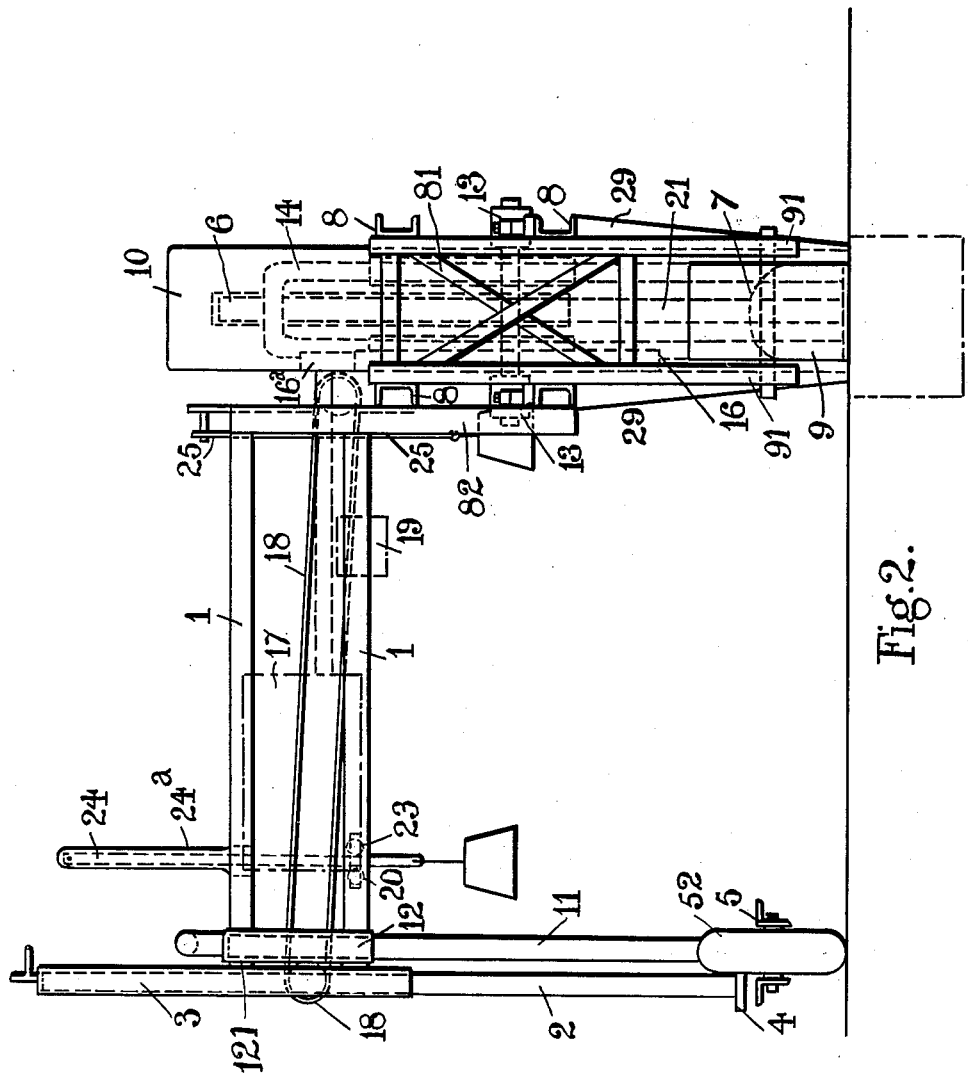
Fig. 2 is a rear elevation of same, parts being omitted for clearness.
Figure 3:
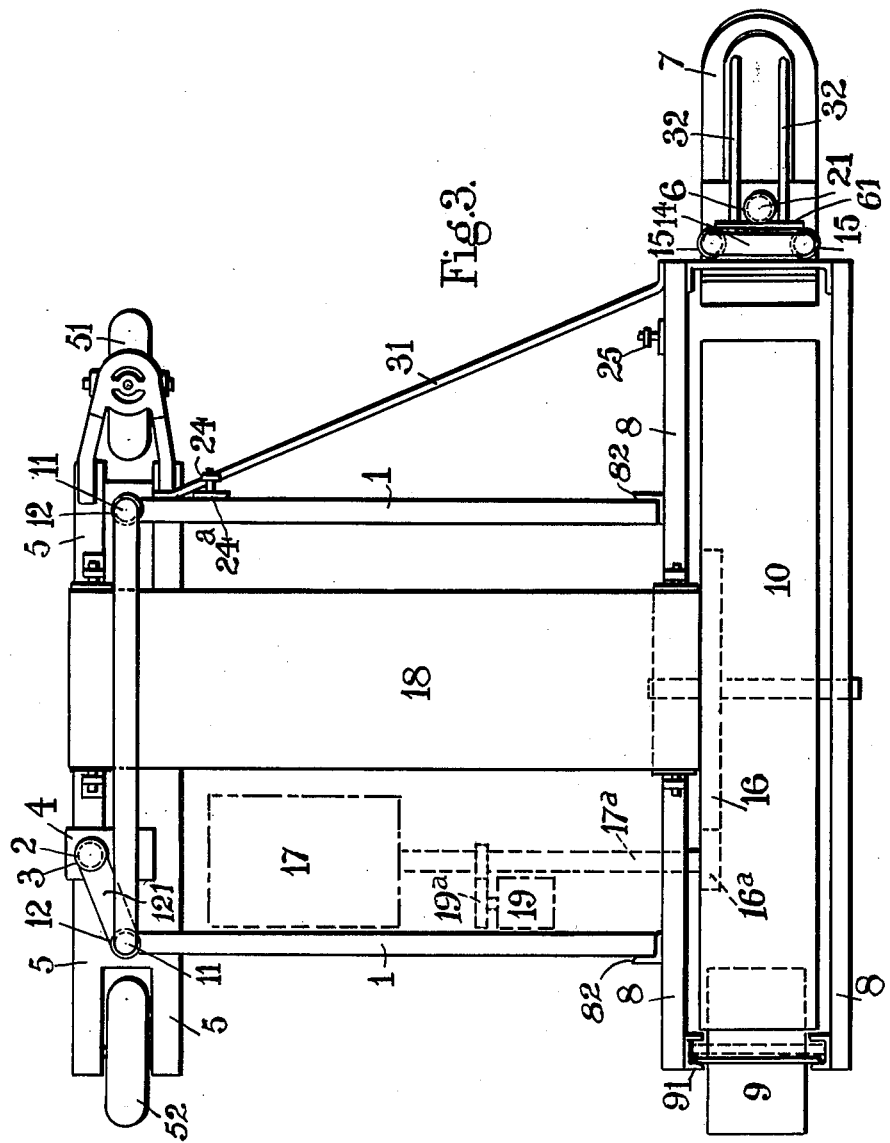
Fig. 3 is a plan of same, parts being omitted for clearness.
Figure 4:
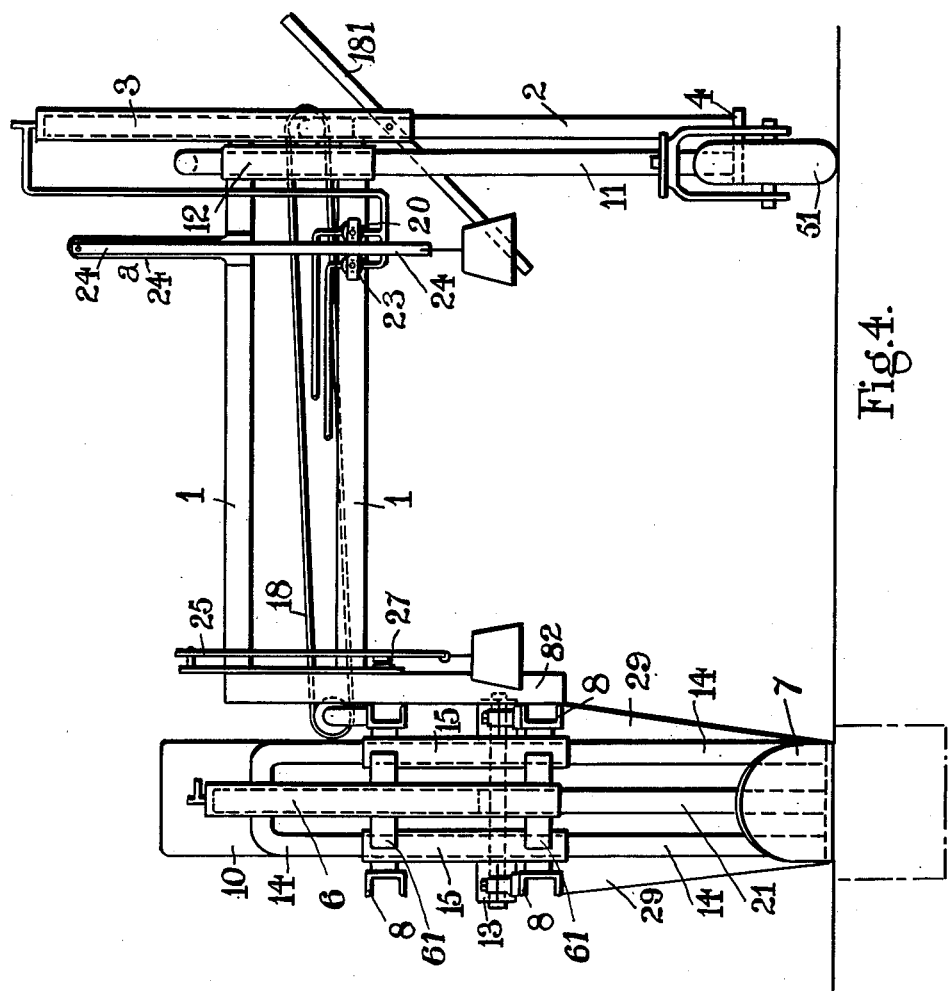
Fig. 4 is a front view, parts being omitted for clearness.

The machine frame comprises cross members 1 carried at one side by sleeves 12 sliding on the legs 11 of a U-shaped guide rod which legs are supported at their lower ends on a wheeled chassis 5 and at the opposite side by sleeves 15 sliding on the legs 14 of a U-shaped guide rod which legs are supported at their lower ends on a skid 7 at the forward end of the machine.

The sleeves 12 are affixed to the cross members 1 to maintain rigid therewith, and the sleeves 15 are similarly coupled to longitudinal members 8 rigidly affixed to the cross members 1 by vertical supports 82.

The frame comprising the cross members 1 and longitudinal members 8 may be raised or lowered on the rods 11 and 14 by means of hydraulic cylinders 3 and 6 in which are mounted rams 2 and 21 respectively. The cylinder 3 is rigidly affixed to the cross members 1 by links 121, the lower end of its ram 2 being mounted on a platform 4 supported on the wheeled chassis 5 intermediate the wheels 51 and 52. The cylinder 6 is rigidly affixed to the longitudinal members 8 by links 61, the lower end of its ram 21 being mounted on the skid 7.

The longitudinal members 8 carry an excavator wheel 10 in bearings 13 bolted to the lower members to be capable of rotating thereon.

The wheels 51 and 52 and the skid 7 are adapted to travel over the ground to be excavated, while the frame comprising the members 1 and 8 supporting the excavating wheel 10 may be raised or lowered relatively thereto according to the depth of ditch or trench to be excavated.

The weight of the excavating wheel and longitudinal members 8 is supported at the rear of the machine by a wheel 9 mounted in vertical pillars 91 affixed to the members 8 to rise and fall with the frame. The wheel 9 travels in the ditch or trench behind the excavator wheel 10.

The excavator wheel 10 is driven through gearing 16 from a gasoline or other engine 17 mounted on the main frame 1, the shaft 17a of this engine having a gear 16a thereon which meshes with the gearing 16, this engine also driving a conveyor belt 18 extending transversely of the main frame, for removing the excavated material, and a pump 19 for supplying fluid under pressure to the cylinders 3 and 6. The drive for the belt 18 is taken from the gearing 16 but is not shown in the drawing. The drive for the pump 19 is taken from the shaft of the engine 17, as by gearing 19a.

Figure 6:
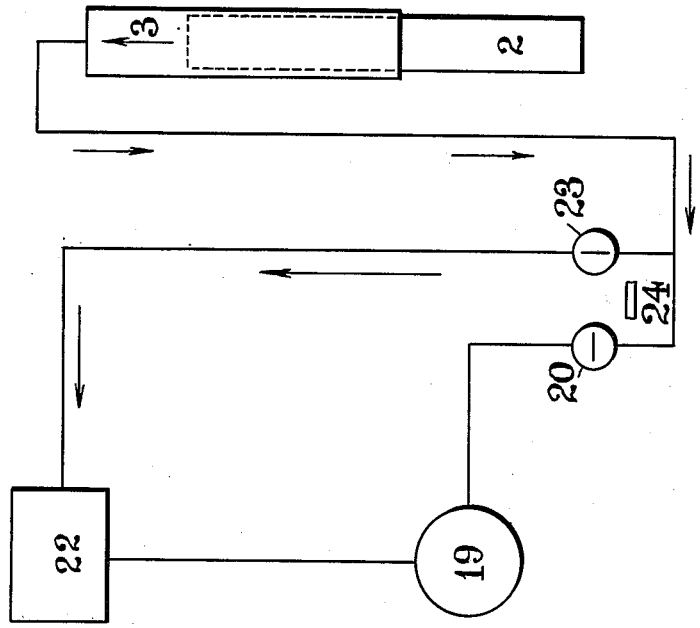
Fig. 6 is a diagrammatic view of the hydraulic return circuit for one of the cylinders.
Figure 5:
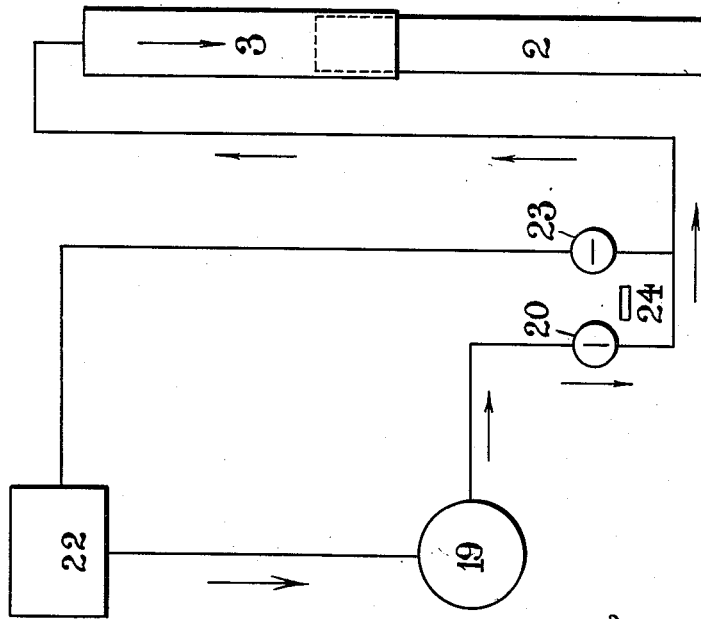
Fig. 5 is a diagrammatic view of the hydraulic feed for one of the cylinders.

The pump 19 is operated continuously and supplies two circuits one controlling each cylinder 3 and 6. The circuits and their controlling valves for the cylinders 3 and 6 are the same, as shown in Figs. 5 and 6. The circuit for operating the cylinder 3 on the side remote from the excavator wheel 10 is provided with a control valve 20 and a relief valve 23, a by-pass valve not shown being provided for returning oil or other fluid from the pump to a supply tank 22 when the control valve 20 is closed. The control valve 20 and relief valve 23 are mounted side by side transversely of the direction of travel of the machine and intermediate the valves a weighted pendulum rod 24 is suspended from a pillar 24a on the frame 1. Movement of the pendulum in one direction opens the control valve 20 to supply fluid to the cylinder 3 whilst movement in the reverse direction closes the control valve 20 and opens the relief valve 23.

A similar pendulum 25 operating a control valve 26 also provided with a by-pass valve (not shown)

and relief valve 27 is provided in the circuit supplying the second cylinder 6 which maintains the depth of cut of the excavator wheel 10, the pendulum 25 in this case being arranged to swing fore and aft i. e. in the direction of travel of the machine.

The excavator wheel 10 is formed with a plurality of vanes or buckets 28 adapted to cut and lift the material excavated and shaped to deposit the material sideways onto the travelling conveyor band 18 extending transversely of the machine, from which it is discharged at the end remote from the excavator wheel 10 on to a chute 181 capable of being positioned to deliver inside or outside the wheeled chassis 5. A pivoted lever may be provided in each bucket adapted to engage a cam on the frame as the bucket rises to the level at which the material will be discharged therefrom to loosen the material from the sides of the bucket.

Stationary vertical blades 29 may be provided longitudinally of the frame members 8 at each side of the excavator wheel 10 to clean out the sides of the ditch or trench, any material being detached by these blades falling into the bottom of the ditch or trench and being picked up by one of the buckets 28.

The members 8 may be braced by diagonal stays 81, and a stay 31 may be provided between one member 8 and a cross member 1, and further stays 32 between the upper ends of the guide rods 14 and the forward end of the skid 7.

The machine is either towed or drawn through suitable tackle (not shown) by a tractor or the like attached to one of the frame members 8 and may be steered by a rod (not shown) attached to the front wheel 51 of the wheeled chassis 5.

To commence excavating a ditch or trench, the machine is drawn forward slowly, the excavator wheel 10 is rotated and a downward feed is applied thereto by manually opening the relief valve 27 to the hydraulic cylinder 6 to lower the frame until the required depth of ditch or trench is reached, the frame being maintained horizontal transversely of the machine during this operation by the automatic control of the relief valve 23 acting on the cylinder 3.

The machine is drawn forward by a tractor or a haulage winch and the depth of the ditch or trench is automatically maintained by the control valve 26 and relief valve 27 operated by the pendulum rod 25 swinging fore and aft of the frame which will operate one or the other of the valves to maintain the depth as the skid rises or falls due to any irregularities in the contour of the ground.

The frame continues to be maintained horizontal transversely of the machine through the automatic operation of the valve 20 and relief valve 23 controlled by the pendulum 24. The operation of this pendulum 24 on the valves 20 and 23 allows the main frame comprising the cross members 1 and longitudinal members 8 to drop horizontally as the excavator wheel 10 descends to the predetermined depth and maintains the main frame horizontal as the wheeled chassis 5 moves forward. If the wheeled chassis 5 encounters a rise or fall in the surface of the ground, the relief or supply valves 20 and 23 to the cylinder 3 are respectively operated by the pendulum to maintain the main frame horizontal.

Where it is desired to cut a ditch or trench having a fall or rise from one end, the control valve 26 operated by the pendulum 25 may be set to open at a predetermined angle of the frame below or above its horizontal position, thereby gradually increasing or decreasing the depth at which the excavator wheel 10 cuts to give for example a one in one hundred rise or fall from one end to the other and of the ditch or trench.

Figure 7:
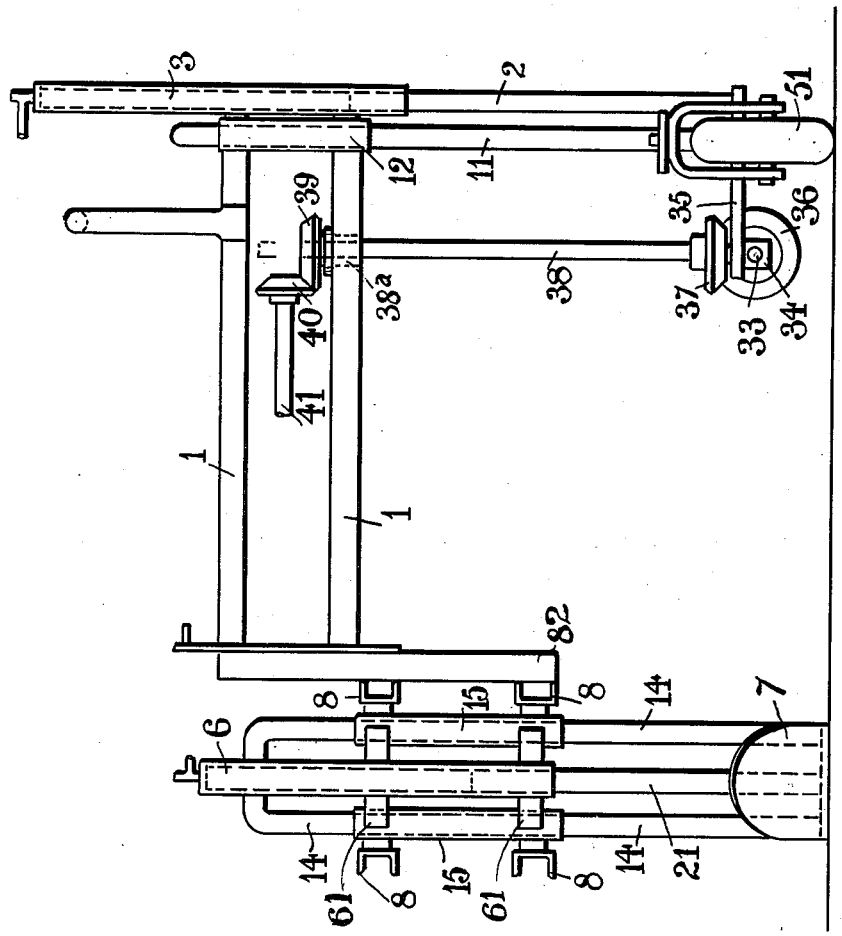
Fig. 7 is a part front elevation of a modification.

In the modification shown in Fig. 7 the excavator wheel 10 is driven from a power take off on a tractor (not shown) to which the ditching machine is coupled through a shaft 33 journalled in a bearing 34 mounted on a bracket 35 carried by the platform 4. A bevel pinion 36 is keyed to the shaft 33 and transmits the drive through a second bevel pinion 37 to a vertical shaft 38 square in cross section.

The upper end of the vertical shaft 38 is capable of sliding in a bevel pinion 39 supported on a bearing 38a on the main frame 1. A bevel pinion 40 mounted on a horizontal shaft 41 transmits the drive from pinion 39 to the excavator wheel 10. Drives for the pump and conveyor belt may be taken from the horizontal shaft 41.

I claim:

1. A mobile ditching machine, comprising a frame, a rotary excavating wheel carried at one side thereof, hydraulic cylinders mounted on the frame, rams in the hydraulic cylinders, a wheeled chassis having a platform supporting one of the rams, a ground engaging member mounted in advance of the excavating wheel and supporting the other ram, a roller mounted on the frame in a position behind the excavating wheel to travel along the bottom of a ditch cut by the excavating wheel, a pair of pendulums on the frame, one pendulum mounted to swing transversely of the machine and operatively connected to one cylinder and the other pendulum mounted to swing fore and aft of the machine and operatively connected to the other cylinder, and valves controlled by the respective pendulums for supplying fluid pressure to the respective cylinders to maintain the frame horizontal transversely and to maintain the frame at a predetermined fore and aft inclination to the direction of travel.

2. A mobile ditching machine as defined in claim 1, including vertical sleeves fixed to and carrying said frame, and rods on which the respective sleeves are slidable under control of said hydraulic cylinders and rams.

3. A mobile ditching machine as defined in claim 1, including side blades fixed to said frame at the respective sides of said excavating wheel to trim the sides of the ditch cut by said wheel.

JOHN WESLEY HULSE.

REFERENCES CITED

The following references are of record in the file of this patent:

UNITED STATES PATENTS

| Number | Name | Date |
| --- | --- | --- |
| 523,790 | Hill | July 31, 1894 |
| 1,522,340 | Stading | Jan. 6, 1925 |
| 2,088,369 | Flynn | July 27, 1937 |
| 2,140,823 | Van Voorhis | Dec. 20, 1938 |
| 2,278,031 | Kramer | Mar. 31, 1942 |
| 2,310,930 | Blanchett | Feb. 16, 1943 |